No. 647,740. Patented Apr. 17, 1900.
J. P. BEATTY.
BOWL ATTACHMENT FOR TOBACCO PIPES.
(Application filed Jan. 23, 1900.)
(No Model.)
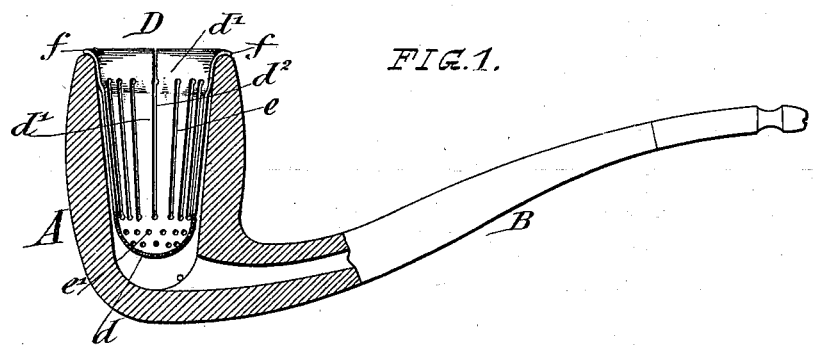
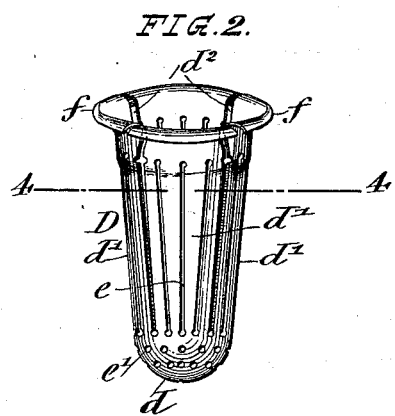 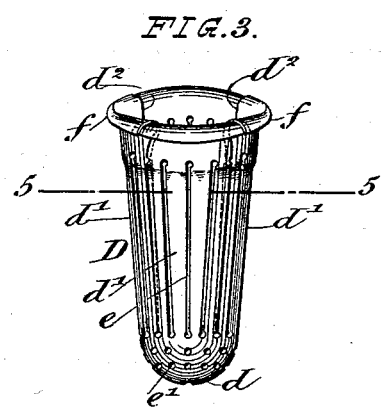
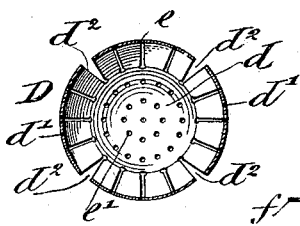 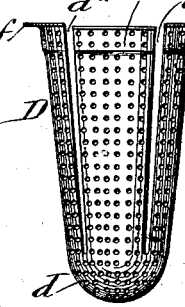 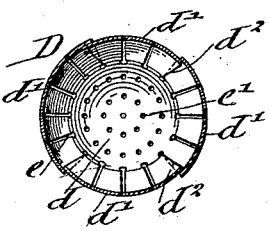
WITNESSES:
Geo. L. Wheelock
M. N. Wurtzel
INVENTOR
John P. Beatty
BY
ATTORNEYS

UNITED STATES PATENT OFFICE.

JOHN P. BEATTY, OF NEWARK, NEW JERSEY.

BOWL ATTACHMENT FOR TOBACCO-PIPES.

SPECIFICATION forming part of Letters Patent No. 647,740, dated April 17, 1900.

Application filed January 23, 1900. Serial No. 2,432. (No model.)

*To all whom it may concern:*

Be it known that I, JOHN P. BEATTY, a citizen of the United States, residing at Newark, in the county of Essex and State of New Jersey, have invented certain new and useful Improvements in Bowl Attachments for Tobacco-Pipes, of which the following is a specification.

This invention relates to tobacco-pipes of that class which are provided with bowl attachments in the form of baskets which hold the tobacco and which fit into the bowl to facilitate perfect combustion and to prevent the nicotin from clogging the pipe-stem.

In order to fit approximately to bowls of different sizes, so that a comparatively-slight air-space is formed between the basket and the bowl as distinguished from a considerable air-space and to assure that the basket will contain enough tobacco for an enjoyable smoke, a peculiar construction of basket which will practically conform or adjust itself to the interior of the bowl is necessary. It is one object of my invention to attain this result.

A further object is to so construct the basket that it can be readily inserted in and removed from the bowl.

With these ends in view my invention consists of certain features of construction to be hereinafter described in detail and then claimed.

In the accompanying drawings, Figure 1 is a sectional side view of a tobacco-pipe, showing my invention. Fig. 2 is a detail perspective view of the tobacco basket or lining in normal expanded condition, and Fig. 3 is a similar view showing it contracted. Fig. 4 is a transverse section on line 4 4, Fig. 2. Fig. 5 is a transverse section on line 5 5, Fig. 3; and Fig. 6 is a side view of a modified form of basket.

Similar letters of reference indicate corresponding parts throughout the drawings.

A indicates a pipe-bowl of the ordinary kind, and B the stem.

D indicates the basket, lining, or tobacco-holder, which is of thimble shape in general appearance and is made of suitably-thin metal, such as sheet-tin or aluminium. The body of the basket is perforated, slitted, or slashed after the manner shown. In Figs. 1 to 5 the basket is slitted or slashed to provide slits $e$ and is also provided with perforations $e'$, while in Fig. 6 the basket is simply perforated. The invention, however, does not depend on the nature of the said interstitial formations in the basket, excepting that in the case of the slits it is preferable to run the same lengthwise of the basket.

The basket D is constructed with a bottom portion $d$ and with a plurality of upwardly-extending petaliform retainers $d'$, which are closely arranged and separated by slits $d^2$, extending through the upper end of the basket. The retainers are not widely separated when in normal expanded position, as a practically-continuous cross-section should be obtained, and they are so bent as that the side edges of the adjacent ones will overlap, as shown in Figs. 3 and 5, when contracted. Lips $f$ project outwardly from the upper ends of the petaliform retainers, so that when the basket D is inserted in the bowl of a pipe and pushed down the lips will come in contact with the rim of the bowl, and thereby prevent the basket from being pushed down too far, as it should not touch the bottom of the bowl. Said lips are also made so as to overlap or slide one on the other, as shown in Fig. 3, when the retainers are contracted.

The basket D tapers at a sufficient distance below the upper ends of the retainers so as to allow the upper portion to frictionally bear on the inner surface of the bowl and hold the basket in position.

A basket or lining constructed adjustably as described is adaptable to different-sized bowls and is retained therein simply by contracting the same more or less, the spring action of the retainers serving to that end It is unnecessary in order to contract the basket or lining to press the retainers together with the fingers, as on pushing the basket into the bowl the smaller size of the bowl will act to automatically contract the basket, which "self-adjusts" itself, as it were. Sometimes the retainers will be separated and sometimes they will overlap, depending on the size of the bowl which receives the basket.

There is always more or less space between the main lower portion of the basket and the bowl; but never so much space as that the expansible basket will not practically conform to the bowl or so that the tobacco in the basket is not surrounded by a slight air-space, which will facilitate the more perfect combustion of the tobacco. The practically-snug fit of the upper part of the basket against the inner surface of the bowl prevents any objectionable amount of air passing in there, so that when the pipe is smoked the tendency of the smoke is to pass both out of the sides of the basket, below the upper portion thereof, and out through the bottom of the same, and hence all of the smoke is not drawn through the unburned tobacco, nor the quality of the latter thereby injured.

The basket is preferably made by cutting the same out in flat sheet form and then bending up the retainers and lips; but it is evident that it can be made in any other desirable manner.

I am aware that devices which fit into the bowls of tobacco-pipes for holding the tobacco and which are constructed to fit different sizes of bowls are not new and that bowl-baskets which are perforated and are provided with retaining devices are also not new, and I do not therefore claim the same broadly, as my invention contains the prominent features of these different devices assembled in the form of a practically-continuous lining for the bowl at all times, which can itself be adjusted to different sizes of bowls.

Having thus described my invention, I claim as new and desire to secure by Letters Patent—

1. A bowl attachment for tobacco-pipes, consisting of an interstitial thimble-shaped basket or lining constructed with adjustable retainers forming the walls of the basket or lining and conformable to the interior walls of various sizes of pipe-bowls, said retainers being arranged near together and at all times practically continuous around the circumference of the basket or lining, substantially as set forth.

2. A bowl attachment for tobacco-pipes, consisting of an interstitial basket, having slots providing spring-retainers, said slots being narrow so as not to materially interrupt the continuity of the basket, substantially as set forth.

3. A bowl attachment for tobacco-pipes, consisting of an interstitial basket, constructed with contractible overlapping retainers, substantially as set forth.

4. The combination with a tobacco-pipe, of a lining for the bowl, constructed with relatively-movable interstitial petaliform retainers, slightly separated normally and adapted to self-adjust themselves and to, at all times, practically conform to and cover the interior of bowls of different sizes, substantially as set forth.

In testimony that I claim the foregoing as my invention I have signed my name in presence of two subscribing witnesses.

JOHN P. BEATTY.

Witnesses:
GEO. L. WHEELOCK,
M. H. WURTZEL.